(12) United States Patent
Nakasone

(10) Patent No.: US 12,203,297 B2
(45) Date of Patent: Jan. 21, 2025

(54) UNLOCKING DEVICE

(71) Applicant: PIOLAX, INC., Kanagawa (JP)

(72) Inventor: Hisashi Nakasone, Kanagawa (JP)

(73) Assignee: PIOLAX, INC., Kanagawa (JP)

(*) Notice: Subject to any disclaimer, the term of this patent is extended or adjusted under 35 U.S.C. 154(b) by 215 days.

(21) Appl. No.: 17/782,001

(22) PCT Filed: Dec. 3, 2020

(86) PCT No.: PCT/JP2020/045002
§ 371 (c)(1),
(2) Date: Jun. 2, 2022

(87) PCT Pub. No.: WO2021/117594
PCT Pub. Date: Jun. 17, 2021

(65) Prior Publication Data
US 2023/0003060 A1    Jan. 5, 2023

(30) Foreign Application Priority Data

Dec. 10, 2019 (JP) ................................ 2019-222722

(51) Int. Cl.
*E05B 83/30* (2014.01)
*B60R 7/06* (2006.01)
(Continued)

(52) U.S. Cl.
CPC ............... *E05B 83/30* (2013.01); *B60R 7/06* (2013.01); *E05C 9/04* (2013.01); *E05C 9/10* (2013.01)

(58) Field of Classification Search
CPC ... E05C 9/04; E05C 9/10; E05B 83/30; B60R 7/06; Y10T 292/0834; Y10T 292/0836;
(Continued)

(56) References Cited

U.S. PATENT DOCUMENTS 7,712,798 B2 * 5/2010 Kraus ................. E05C 9/043
292/37
2007/0289345 A1    12/2007 Kozuka et al.
(Continued)

FOREIGN PATENT DOCUMENTS

JP    2016-070021 A    5/2016
JP    2017-001427 A    1/2017
(Continued)

OTHER PUBLICATIONS

Jan. 26, 2021, International Search Report issued for related PCT application No. PCT/JP2020/045002.
(Continued)

*Primary Examiner* — Christine M Mills
*Assistant Examiner* — Yahya Sidky
(74) *Attorney, Agent, or Firm* — Paratus Law Group, PLLC

(57) ABSTRACT

There is provided an unlocking device, including: a rotating member; a housing; an operating member; and a biasing member. The rotating member includes a pressed portion, and a retaining portion. The housing includes an accommodating portion, an engaging portion that is engaged with the retaining portion, and an opening. The operating member includes a pressing portion, and is slidable in a direction substantially parallel to a rotation plane of the rotating member. The retaining portion and the engaging portion are located within a thickness range of the operating member when viewed in a sliding direction of the operating member.

4 Claims, 18 Drawing Sheets

(51) Int. Cl.
*E05C 9/04* (2006.01)
*E05C 9/10* (2006.01)

(58) Field of Classification Search
CPC ........... Y10T 292/084; Y10T 292/0845; Y10T 292/0846; Y10T 292/0977; Y10T 292/0995; Y10T 292/0997
See application file for complete search history.

(56) References Cited

U.S. PATENT DOCUMENTS

| | | | |
|---|---|---|---|
| 2014/0008921 A1* | 1/2014 | Shimizu | E05B 63/14 292/156 |
| 2016/0097225 A1* | 4/2016 | Tamaki | E05B 83/30 292/137 |
| 2017/0044803 A1* | 2/2017 | Nakasone | E05B 77/36 |

FOREIGN PATENT DOCUMENTS

| | | |
|---|---|---|
| JP | 6420618 B2 | 11/2018 |
| WO | WO 2012/132546 A1 | 10/2012 |
| WO | WO 2015/125687 A1 | 8/2015 |
| WO | WO 2015/163282 A1 | 10/2015 |

OTHER PUBLICATIONS

Jan. 26, 2021, International Search Opinion issued for related PCT application No. PCT/JP2020/045002.

* cited by examiner

# UNLOCKING DEVICE

CROSS REFERENCE TO PRIOR APPLICATION

This application is a National Stage Patent Application of PCT International Patent Application No. PCT/JP2020/045002 (filed on Dec. 3, 2020) under 35 U.S.C. § 371, which claims priority to Japanese Patent Application No. 2019-222722 (filed on Dec. 10, 2019), which are all hereby incorporated by reference in their entirety.

TECHNICAL FIELD

The present invention relates to, for example, an unlocking device for releasing a lock of an opening and closing body openably and closably attached to an opening portion of a fixed body from a closed and locked state.

BACKGROUND ART

For example, an opening and closing body such as a lid is openably and closably attached to an opening portion formed in a fixed body such as a glove box of an automobile. An unlocking device is provided between the opening portion and the opening and closing body so as to release a lock of the opening and closing body from a closed and locked state.

As a related unlocking device of this type, Patent Literature 1 listed below describes an unlocking device including a rotating member including an actuating portion for moving a locking member by rotation, a case member rotatable supporting the rotating member, an operating member slidable in a direction substantially parallel to a rotation plane of the rotating member, a spring member that abuts on both the case member and the rotating member to bias the rotating member in a predetermined rotation direction, and a link structure for converting sliding of the operating member into rotation of the rotating member.

The case member is provided with an accommodating portion accommodating the operating member, a support portion having a shaft shape protrudes from a front side wall portion of the accommodating portion, and the support portion rotatably supports the rotating member. The case member has a bottom wall and a pair of side walls erected from the bottom wall, and a rotor holding portion having a substantially L-shaped hook shape is provided from an upper end of each of the side walls. The pair of rotor holding portions are arranged above the rotation plane of the rotating member and press the rotating member, so that the rotating member is retained and held with respect to the case member.

CITATION LIST

Patent Literature

Patent Literature 1: Japanese Patent No. 6420618

SUMMARY OF INVENTION

Technical Problem

However, in the unlocking device of Patent Literature 1, the pair of rotor holding portions are arranged above the rotation plane of the rotating member, and the retaining structure of the rotating member protrudes, and thus there is a disadvantage that a thickness of the unlocking device is increased by that amount.

Therefore, an object of the present invention is to provide an unlocking device capable of reducing a thickness of the device.

Solution to Problem

In order to achieve the above object, the present invention includes: a rotating member configured to slide, by rotation, a locking member engaged with and disengaged from a locking portion; a housing that rotatably supports the rotating member; an operating member configured to rotate the rotating member and a biasing member configured to rotationally bias the rotating member. The rotating member includes a pressed portion configured to be pressed by the operating member, and a retaining portion configured to retain the rotating member with respect to the housing. The housing includes an accommodating portion configured to slidably accommodate the operating member, an engaging portion that is engaged with the retaining portion, and an opening that communicates with the accommodating portion. The operating member includes a pressing portion configured to press the pressed portion, is configured to be accommodated in the accommodating portion, is slidable in a direction substantially parallel to a rotation plane of the rotating member, and is biased in a direction protruding from the opening by a rotational biasing force from the pressed portion being applied to the pressing portion. The retaining portion and the engaging portion are located within a thickness range of the operating member when viewed in a sliding direction of the operating member.

Advantageous Effects of Invention

According to the present invention, the retaining portion and the engaging portion are located within the thickness range of the operating member when viewed in the sliding direction of the operating member, and thus a thickness of an unlocking device can be reduced.

BRIEF DESCRIPTION OF DRAWINGS

FIGS. 3A and 3B show a housing constituting the unlocking device, in which FIG. 3A is a perspective view thereof, and FIG. 3B is a perspective view thereof as viewed from a direction different from that of FIG. 3A.

FIGS. 4A to 4C show the housing constituting the unlocking device, in which FIG. 4A is a front view thereof, FIG. 4B is a plan view thereof, and FIG. 4C is a bottom surface view thereof.

FIGS. 5A to 5C show an operating member constituting the unlocking device, in which FIG. 5A is a perspective view thereof, FIG. 5B is a perspective view thereof as viewed from a direction different from that of FIG. 5A, and FIG. 5C is a perspective view thereof in a state where a rotating member is disposed in FIG. 5B.

FIGS. 6A and 6B show the operating member constituting the unlocking device, in which FIG. 6A is a side view thereof, and FIG. 6B is a plan view thereof.

FIGS. 7A and 7B show the rotating member constituting the unlocking device, in which FIG. 7A is a perspective view thereof, and FIG. 7B is a perspective view thereof as viewed from a direction different from that of FIG. 7A.

DESCRIPTION OF EMBODIMENTS

Hereinafter, an embodiment of an unlocking device according to the present invention will be described with reference to the drawings.

Figure 1:
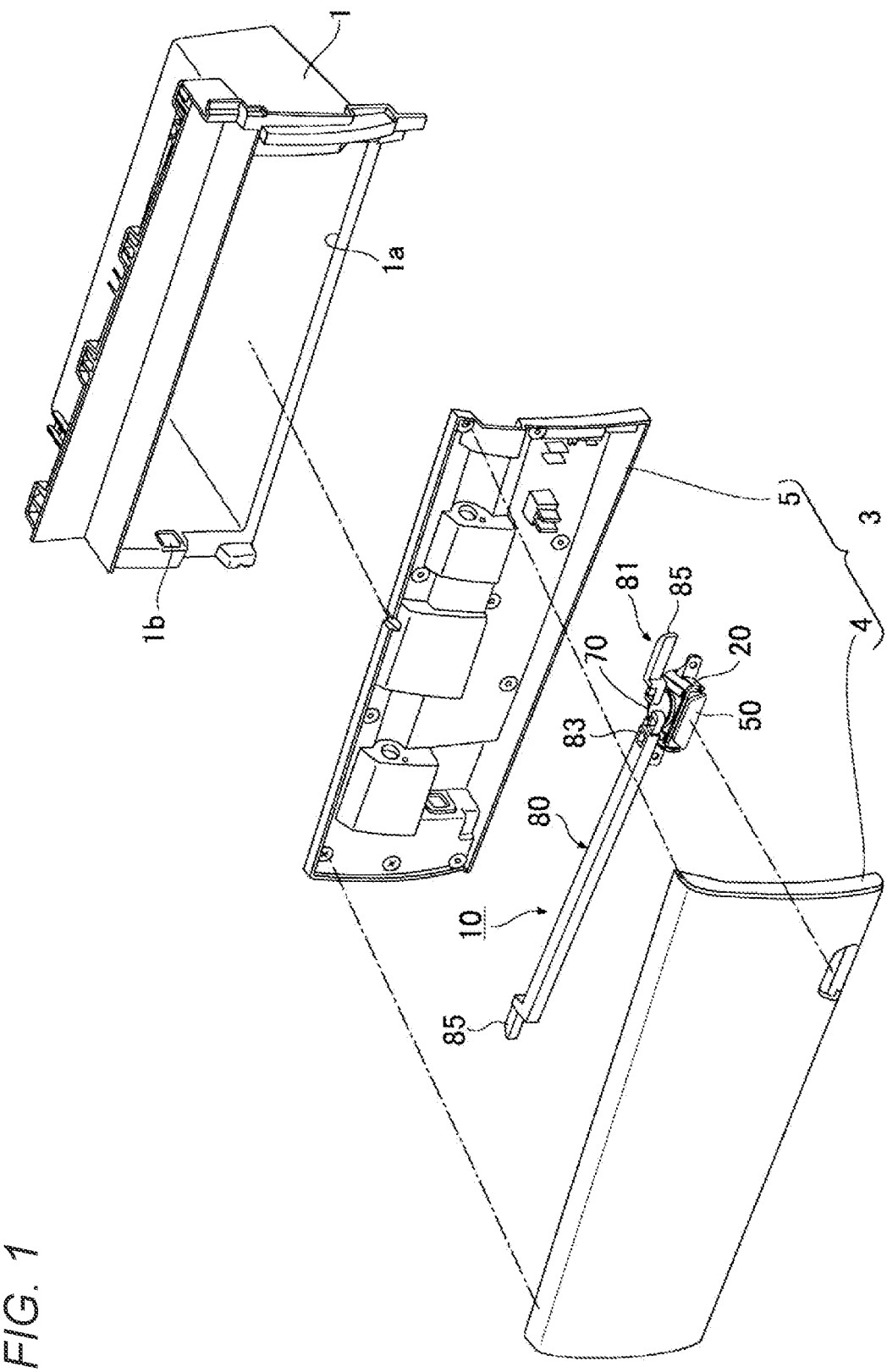
FIG. 1 is a perspective view of an embodiment of an unlocking device according to the present invention in a case where the unlocking device is applied to an opening and closing structure of an opening and closing body.
Figure 2:
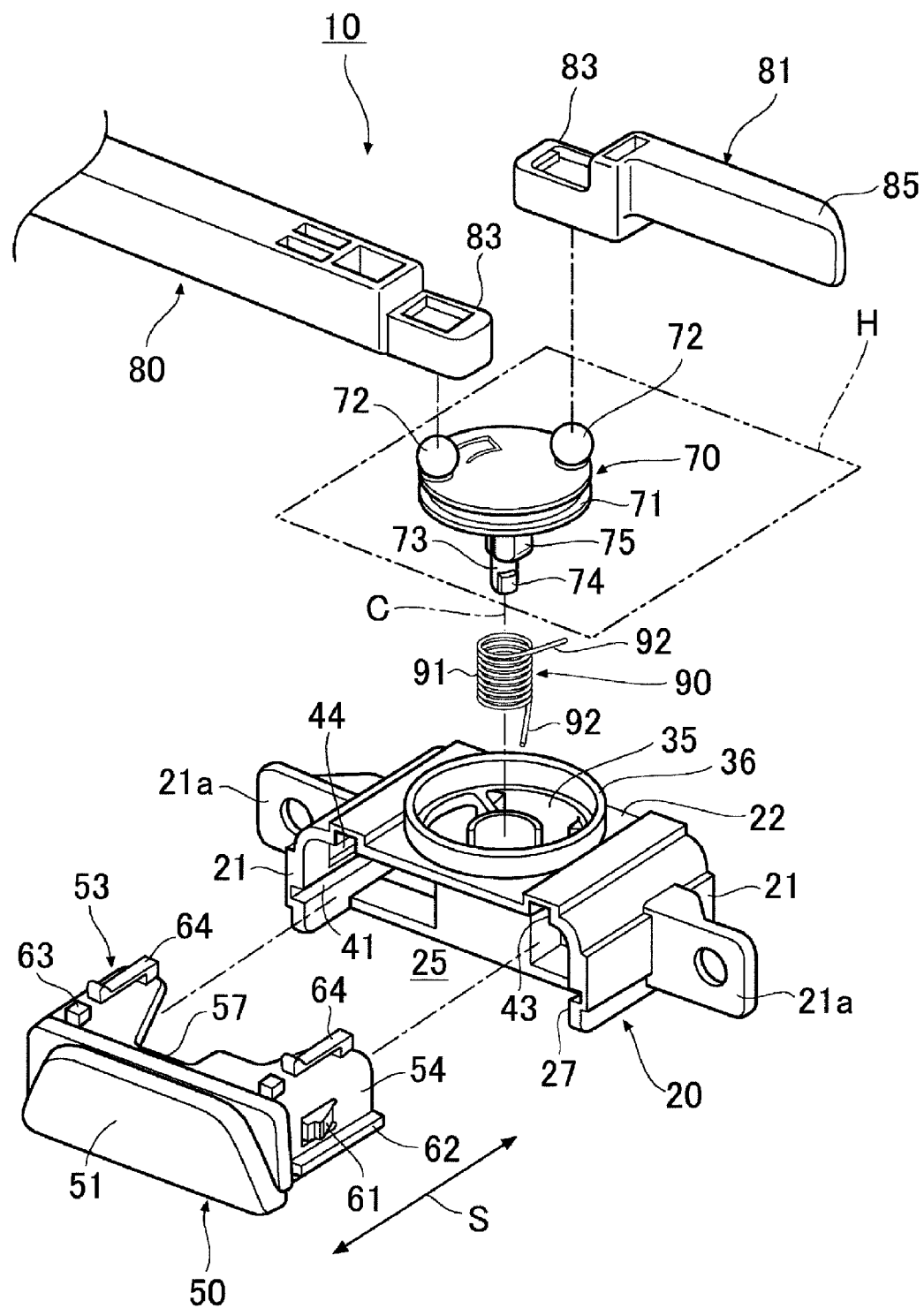
FIG. 2 is an exploded perspective view of the unlocking device.

As shown in FIG. 1, for example, an opening and closing body 3 such as a lid is operably and closably attached to an opening portion 1a of a fixed body 1 such as an instrument panel of a vehicle. As shown in FIGS. 1 and 2, an unlocking device 10 (hereinafter, also simply referred to as the "release device 10") according to the embodiment is used, for example, to release a lock of the opening and closing body 3 that is locked in a state where the opening portion 1a is closed as described above.

Figure 15:
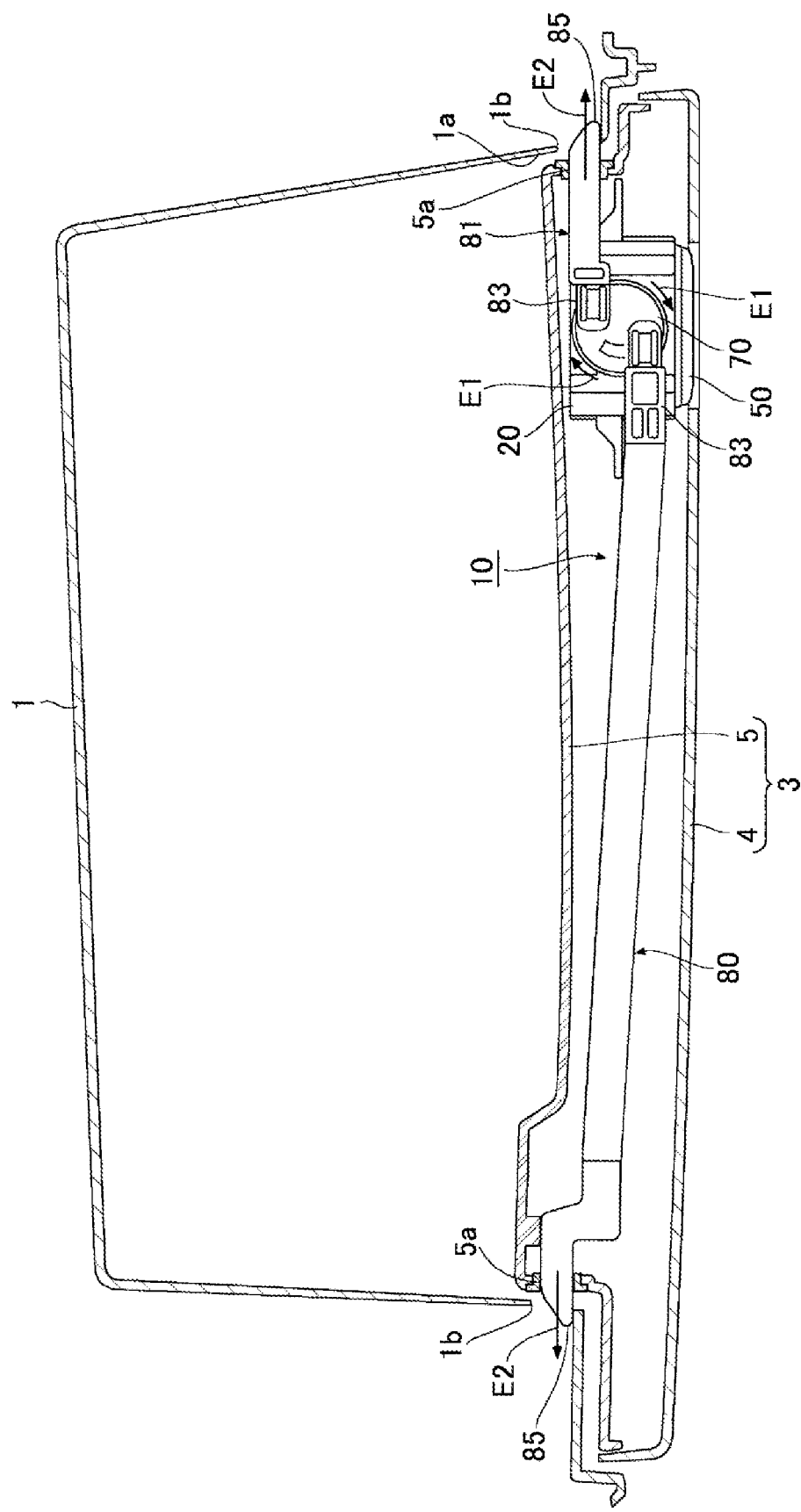
FIG. 15 is an explanatory plan view of a case where the unlocking device is applied to the opening and closing structure of the opening and closing body and where the opening and closing body is locked in a closed state.

As shown in FIGS. 1 and 15, in the embodiment, locking portions 1b and 1b having a hole shape are provided on both inner surfaces of the opening portion 1a of the fixed body 1 in a width direction. The locking portion may have a recessed shape, a protruding shape, a frame shape, or the like instead of a hole shape, and may be provided in the opening and closing body instead of the opening portion of the fixed body, and is not particularly limited.

Figure 11:
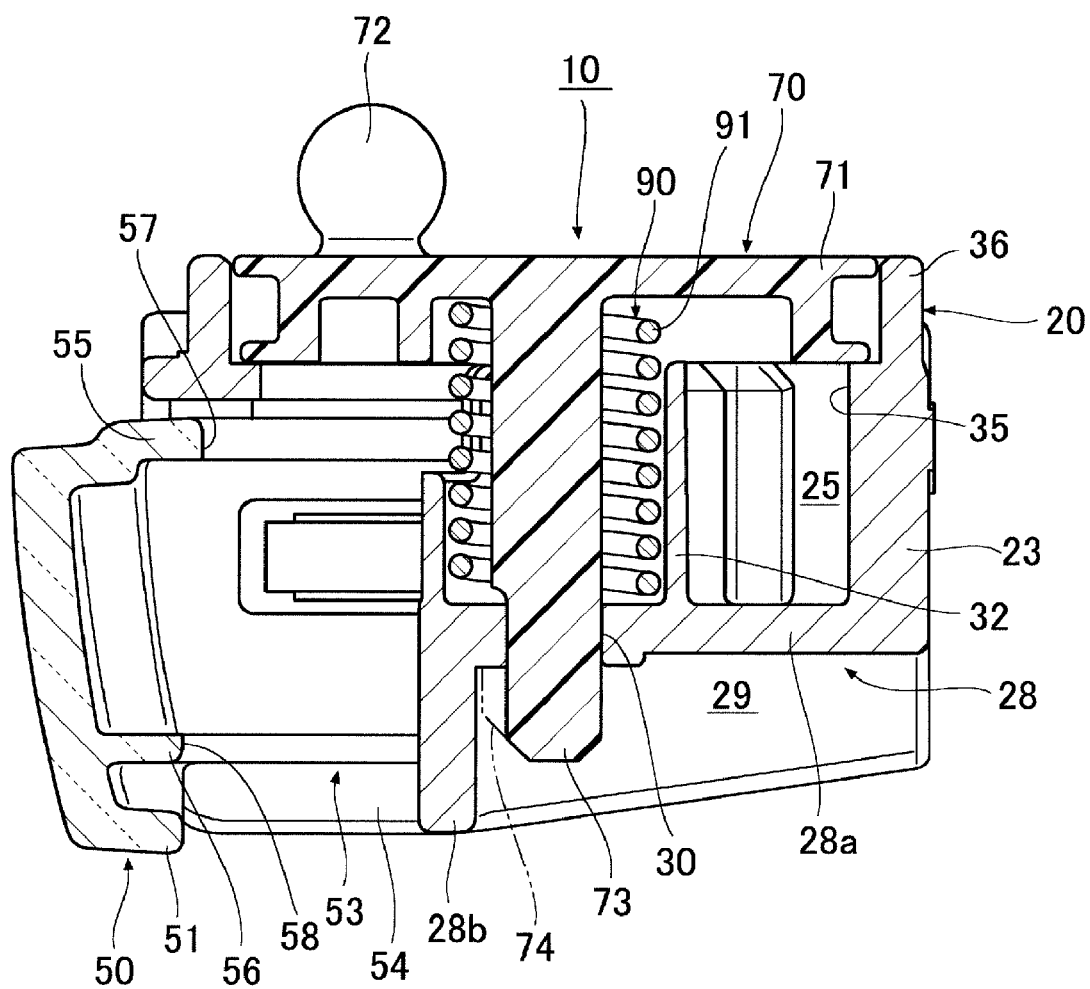
FIG. 11 is a cross-sectional view taken along a line A-A in FIG. 8.
Figure 13:
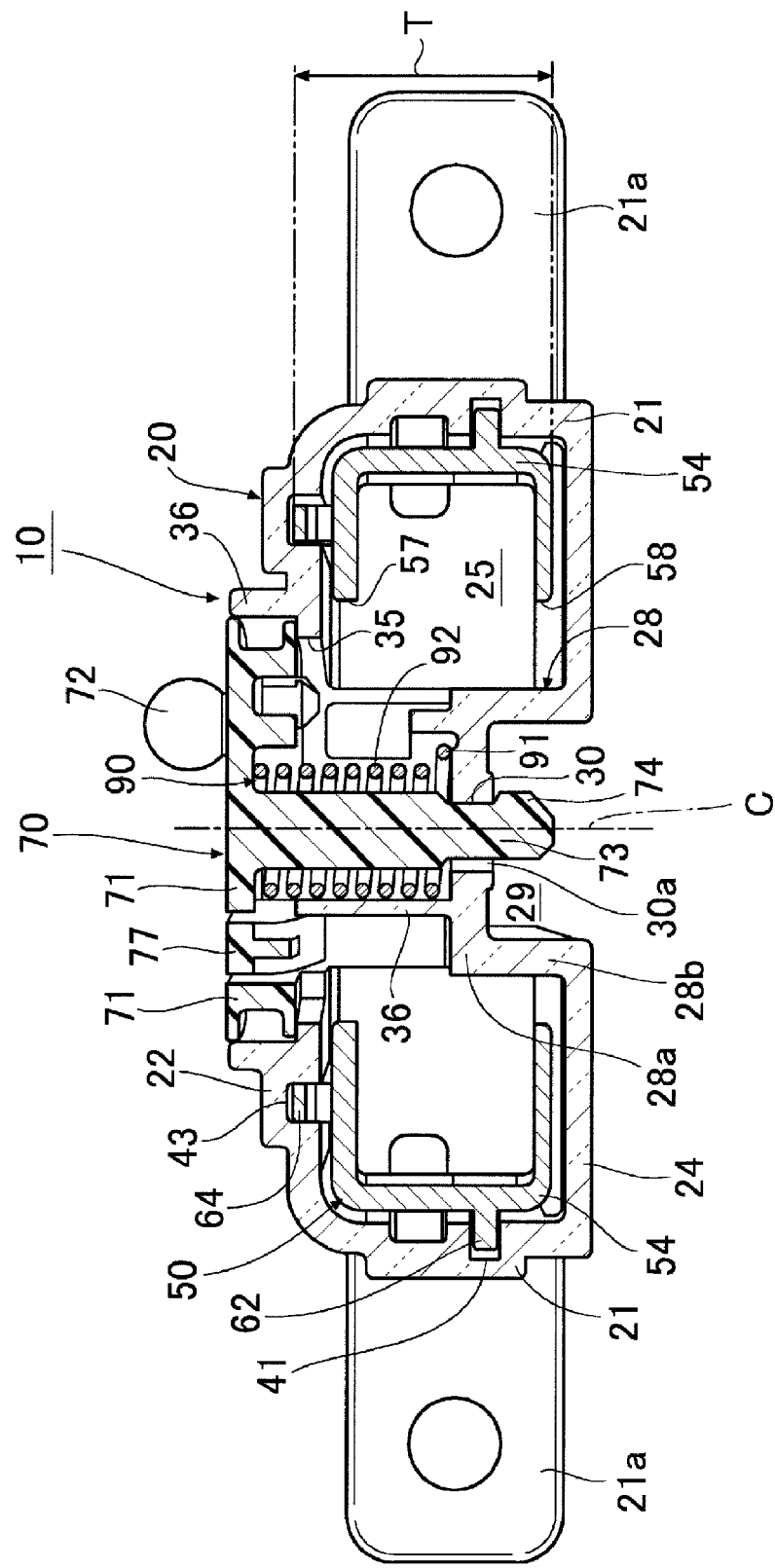
FIG. 13 is a cross-sectional view taken along a line D-D in FIG. 8.

As shown in FIG. 2, the release device 10 includes a rotating member 70 that slides, by rotation, locking members 80 and 81 engaged with and disengaged from the locking portions 1b respectively, a housing 20 that rotatably supports the rotating member 70, an operating member 50 that rotates the rotating member 70, and a biasing member 90 that rotationally biases the rotating member 70. In the embodiment, as shown in FIGS. 11 and 13, a support shaft 73 and a bearing portion 30 rotatably supporting the support shaft 73 are provided between the rotating member 70 and the housing 20. Here, the support shaft 73 is provided on a rotating member 70 side, and the bearing portion 30 (see FIGS. 11 and 13) is provided on a housing 20 side.

As shown in FIG. 1, the locking members 80 and 81 each extend in a rod shape, and have a shape in which an intermediate portion thereof in an axial direction is bent in a substantially crank shape, and one locking member 80 is formed to be long and the other locking member 81 is formed to be short. Recesses (not shown) for connecting with the rotating member 70 are formed on base end portion 83 sides of the locking members 80 and 81, respectively. Further, tip end portions 85 of the locking members 80 and 81 are engaged with and disengaged from the locking portions 1b, respectively (see FIGS. 15 and 16).

Further, as shown in FIG. 2, the biasing member 90 in the embodiment is a torsion spring, and includes a winding portion 91 and a pair of arm portions 92 and 92 extending from the winding portion 91. As shown in FIG. 15, the biasing member 90 rotationally biases the rotating member 70 in a predetermined direction E1, and biases the locking members 80 and 81 connected to the rotating member 70 in a direction (see an arrow E2) in which the locking members 80 and 81 are engaged with the locking portions 1b respectively. The biasing member may be, for example, a pulling spring or the like that pulls one of locking members toward a locking portion side, and may be any member that can bias the locking member in a direction in which the locking member is engaged with a locking portion.

Figure 10:
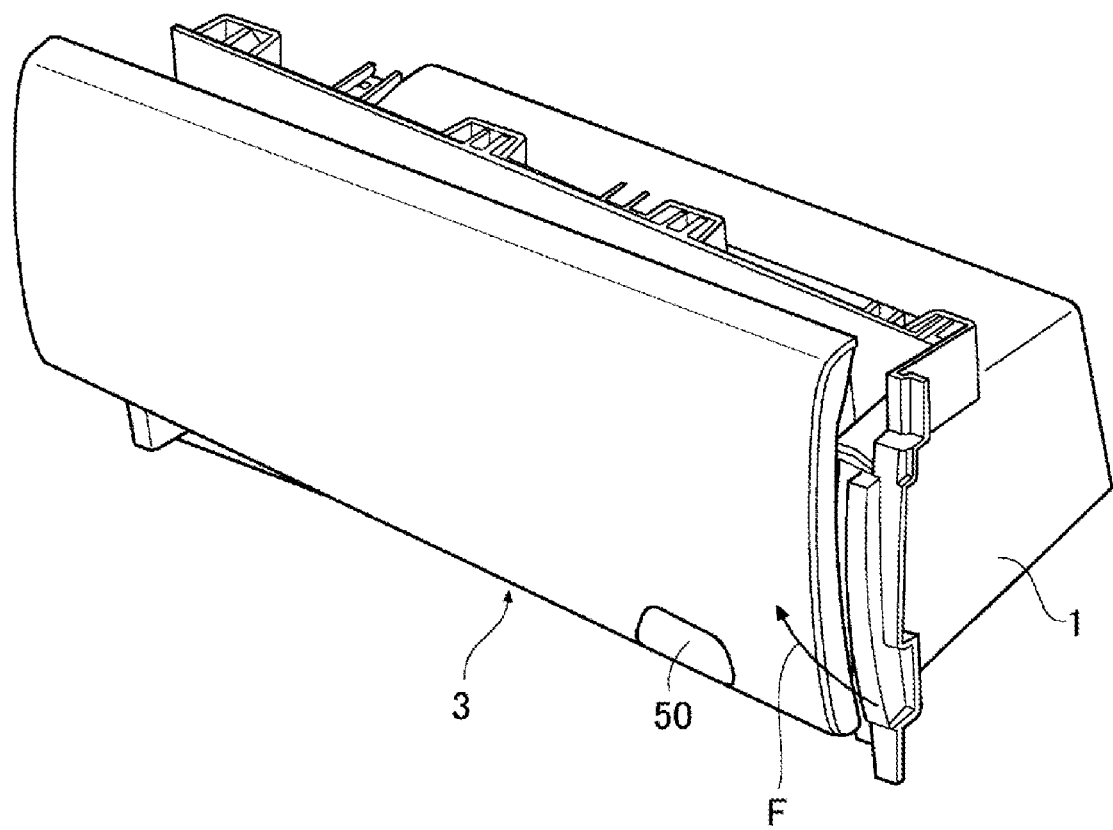
FIG. 10 is a perspective view of the opening and closing structure of the opening and closing body to which the unlocking device is applied in a state in which the opening and closing body is closed.
Figure 16:
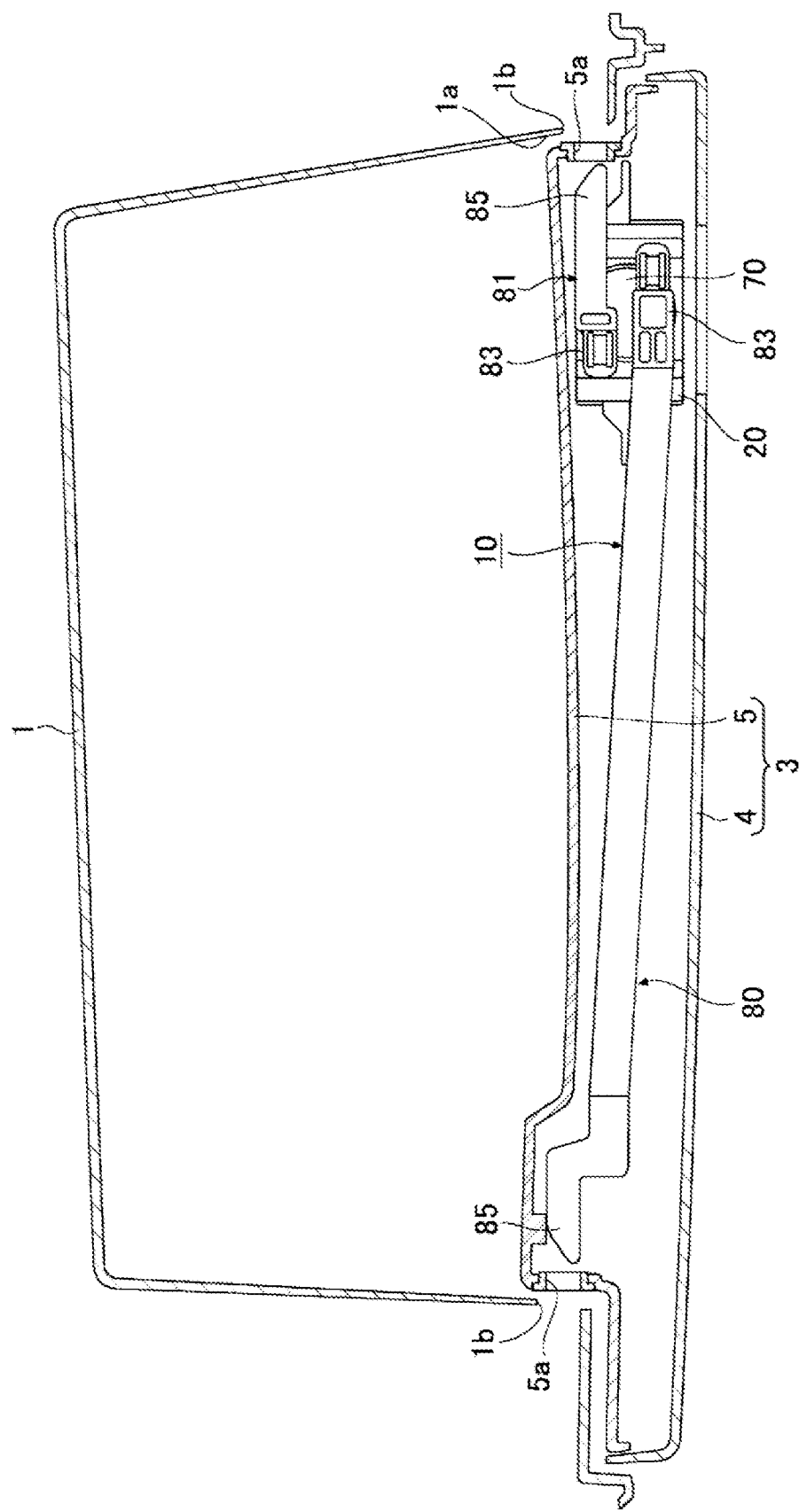
FIG. 16 is an explanatory plan view of a case where the unlocking device is applied to the opening and closing structure of the opening and closing body and where a locked state of the opening and closing body is released.

As shown in FIG. 1, the opening and closing body 3 in the embodiment includes an outer member 4 disposed on an inner side of a vehicle interior, and an inner member 5 disposed on a back side of the outer member 4. Further, the opening and closing body 3 is biased in a direction of opening from the opening portion 1a as shown by an arrow F in FIG. 10 by a lid flip-up structure (not shown) disposed in the fixed body 1. The opening and closing body may be formed of a single plate member instead of a two-member configuration of the outer member 4 and the inner member 5. As shown in FIGS. 15 and 16, insertion holes 5a and 5a, through which the tip end portions 85 and 85 of the locking members 80 and 81 are inserted respectively are formed on both sides of the outer member 4 in a width direction.

As described above, the unlocking device of the embodiment is applied to, for example, a structure in which a lid is operably and closably attached to an opening portion of an instrument panel (in this case, the instrument panel is the "fixed body", and the lid is the "opening and closing body"), but the unlocking device may be applied to a structure in which a box-shaped glove box is rotatably attached to an opening portion of an instrument panel (in this case, the instrument panel is the "fixed body", and the glove box is the "opening and closing body"), and can be widely used for various opening and closing bodies that open and close an opening portion of a fixed body.

Next, each configuration of the release device 10 will be described in detail. First, the housing 20 will be described with reference to FIGS. 3 and 4.

In the following description, a "front side" means one side in a direction orthogonal to a rotation plane H (see FIG. 2) of the rotating member 70, and a "back side" means a side opposite to the "front side". A "front surface side" means a side facing an interior space of a vehicle, and a "back surface side" means a side opposite to the interior space of the vehicle.

The housing 20 of the embodiment includes a pair of side walls 21 and 21 extending in a predetermined length and arranged in parallel to each other, a ceiling wall 22 connecting one end portions of the side walls 21 and 21 to each other, and a back surface wall 23 connecting the pair of side walls 21 and 21 and a back surface side of the ceiling wall 22 to each other. Attachment pieces 21a and 21a protrude from outer surface sides of the pair of side walls 21 and 21, respectively, and the housing 20 is attached to the opening and closing body 3 via the attachment pieces 21a and 21a.

Figure 4A:
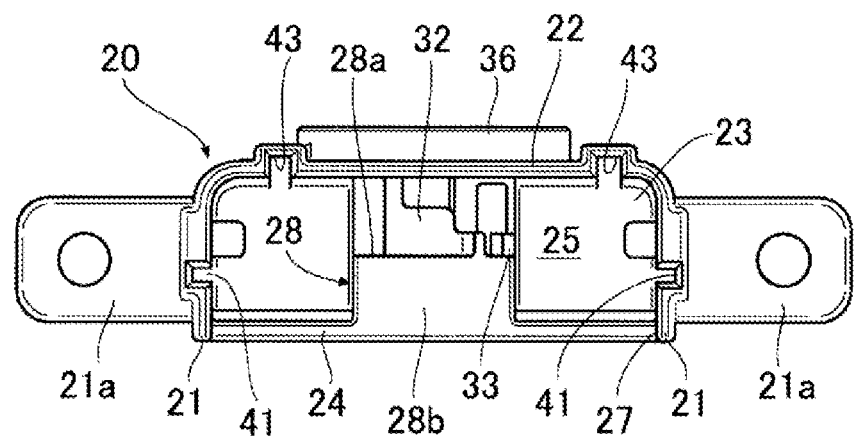
Figure 4B:
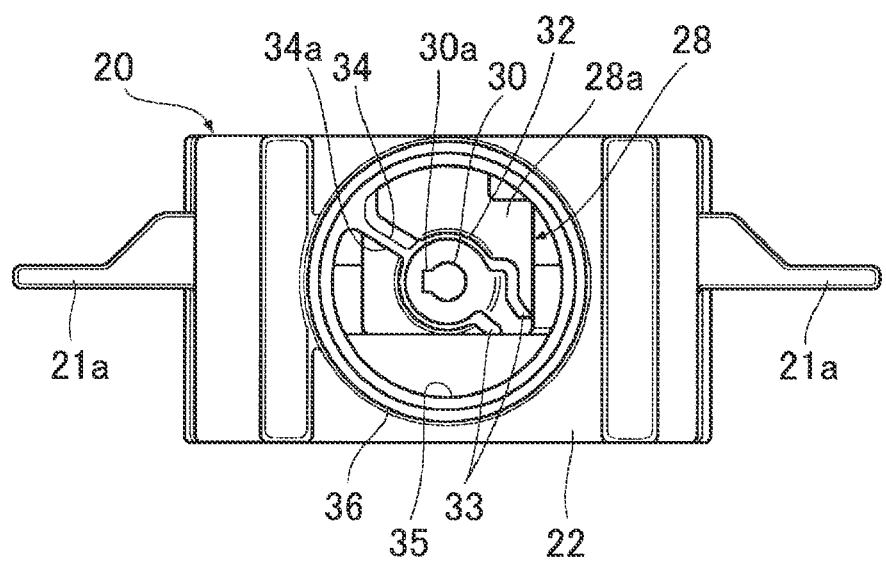
Figure 4C:
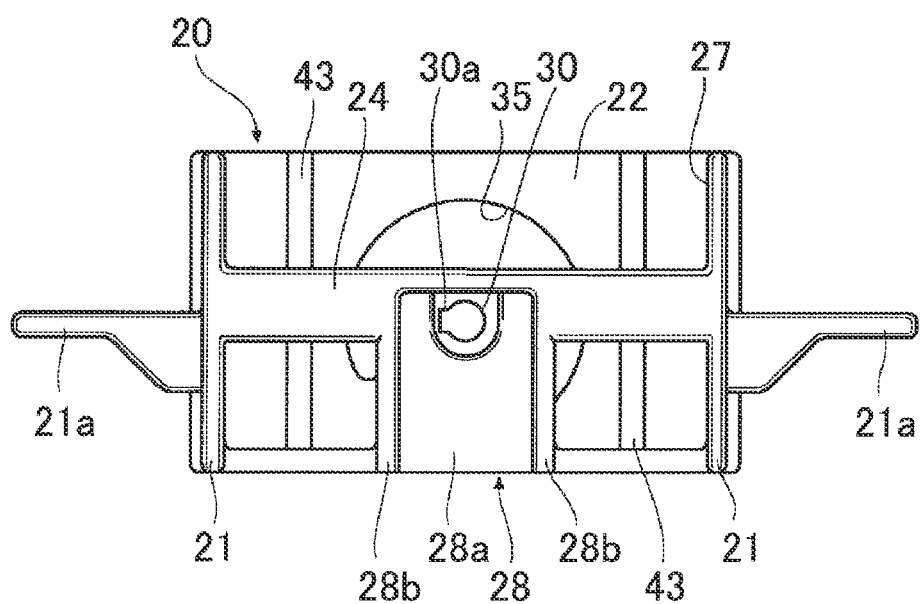

Further, as shown in FIG. 4C, on the other end portions of the pair of side walls 21 and 21, middle portions of the side walls 21 in an extending direction are connected to each other by a bottom wall 24 having a substantially band shape. The walls 21, 22, 23, and 24 define an accommodating portion 25 in an inner side of the housing 20 (see FIGS. 4A and 13). The operating member 50 is slidably accommodated in the accommodating portion 25. That is, the operating member 50 slides in a depth direction of the accommodating portion 25 of the housing 20 (a direction in which the side wall 21 extends). A sliding direction of the operating member 50 is indicated by a symbol "S". An opening 27 communicating with the accommodating portion 25 is formed on a front surface side of the housing 20.

As shown in FIG. 13, a rotor support portion 28 having a frame shape raised toward an inner side of the accommodating portion 25 is provided from the bottom wall 24. Referring also to FIG. 4C, the rotor support portion 28 includes an intermediate wall 28a disposed between the ceiling wall 22 and the bottom wall 24, and a peripheral wall 28b extending downward from a peripheral edge of the intermediate wall 28a and connected to the bottom wall 24 and the back surface wall 23. As shown in FIG. 13, a retaining portion arrangement space 29 in which a retaining portion 74 (see FIG. 7) to be described later of the rotating member 70 is arranged is defined in an inner side of the rotor support portion 28, that is, between the intermediate wall 28a and the peripheral wall 28b.

As shown in FIGS. 4B and 4C, the intermediate wall 28a is provided with the bearing portion 30 having a through-hole shape that rotatably supports the support shaft 73 (see FIG. 7) to be described later provided on the rotating member 70. The hearing portion 30 has a substantially circular shape, and has a substantially keyhole shape in which a notch groove 30a is formed in a part of the bearing portion 30 in a circumferential direction. As shown in FIG. 13, the retaining portion 74 of the rotating member 70 is engaged with a peripheral edge of a back side of the bearing portion 30, so that the rotating member 70 is retained to the housing 20. That is, in the embodiment, the bearing portion is an "engaging portion" in the present invention.

Further, a spring holding portion 32 having a substantially cylindrical shape that holds the winding portion 91 of the biasing member 90 protrudes from a peripheral edge of a front side of the bearing portion 30. As shown in FIG. 4B, an arm holding portion 33 including a pair of ribs and holding one arm portion 92 of the biasing member 90 is provided at a position adjacent to the spring holding portion 32 on the front side of the bearing portion 30. Further, as shown in FIGS. 3B and 4B, a reverse rotation restricting wall 34 is formed on an outer side of the spring holding portion 32 on the front side of the bearing portion 30.

Figure 3A:
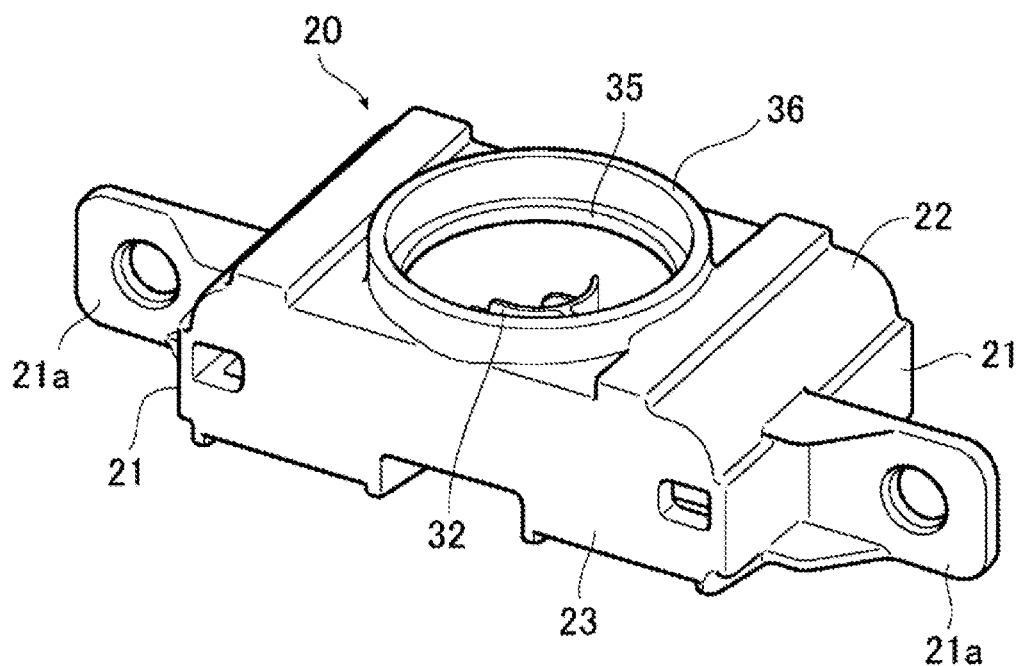

As shown in FIGS. 3 and 4B, the ceiling wall 22 is formed with a rotor support hole 35 having a circular shape that communicates with the accommodating portion 25. As shown in FIG. 13, a rotating body 71 to be described later of the rotating member 70 is supported by a peripheral edge of a front side of the rotor support hole 35. Further, a cylindrical wall 36 having a cylindrical shape protrudes from an outer periphery of a front side of the rotor support hole 35.

Figure 3B:
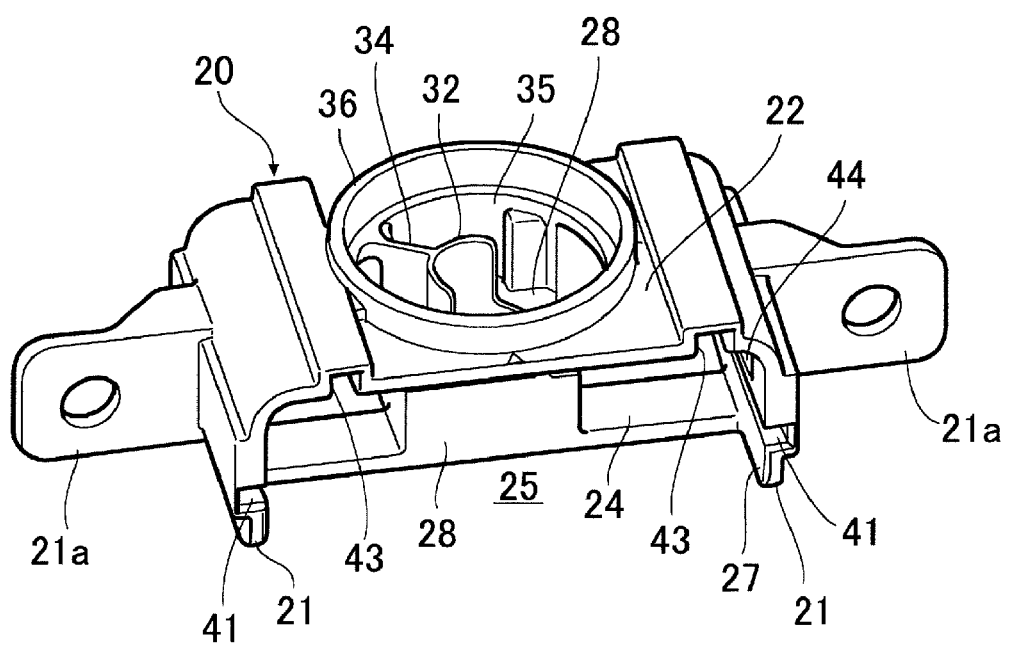

As shown in FIGS. 3B and 4A, guide recesses 41 and 43 having a recessed groove shape along the sliding direction of the operating member 50 are formed on inner sides of the side walls 21 and the ceiling wall 22 respectively. Further, as shown in FIGS. 2 and 3B, a retaining groove 44 having a recessed groove shape is formed at a position adjacent to the guide recess 41 on the inner side of each side wall 21.

A shape and a structure of the housing are not limited to the above aspect. All of the portions (the side walls, the ceiling wall, the back surface wall, the bottom wall, and the like) constituting the housing are integrally formed.

Next, the operating member 50 will be described with reference to FIGS. 5 and 6.

The operating member 50 of the embodiment is a push-type member operated by pushing, and mainly includes a pushing portion 51 for applying a pushing force to the operating member 50, and an insertion portion 53 extending from a back surface side of the pushing portion 51 and inserted into the accommodating portion 25 of the housing 20. As described above, the operating member 50 slides in the depth direction of the accommodating portion 25 of the housing 20, and the sliding direction S of the operating member 50 is slidable in a direction substantially parallel to the rotation plane H (see FIG. 2) of the rotating member 70.

The pushing portion 51 has a shape conforming to an opening 27 of the housing 20 and covers the opening 27. The insertion portion 53 includes a pair of side walls 54 and 54 extending in a predetermined length and arranged in parallel to each other, a connecting wall 55 connecting one end portions of the side walls 54 and 54 to each other, and a connecting wall 56 connecting the other end portions of the pair of side walls 54 and 54 to each other.

Figure 14A:
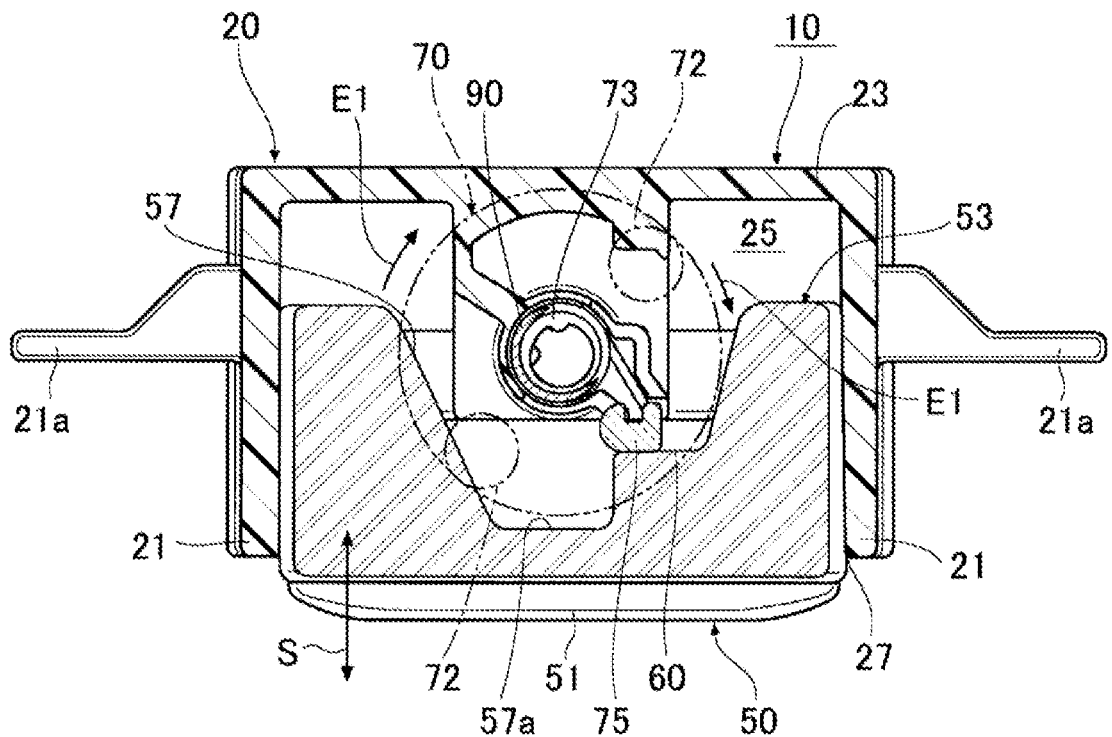
FIG. 14A is a cross-sectional view taken along a line G-G in FIG. 8.
Figure 14B:
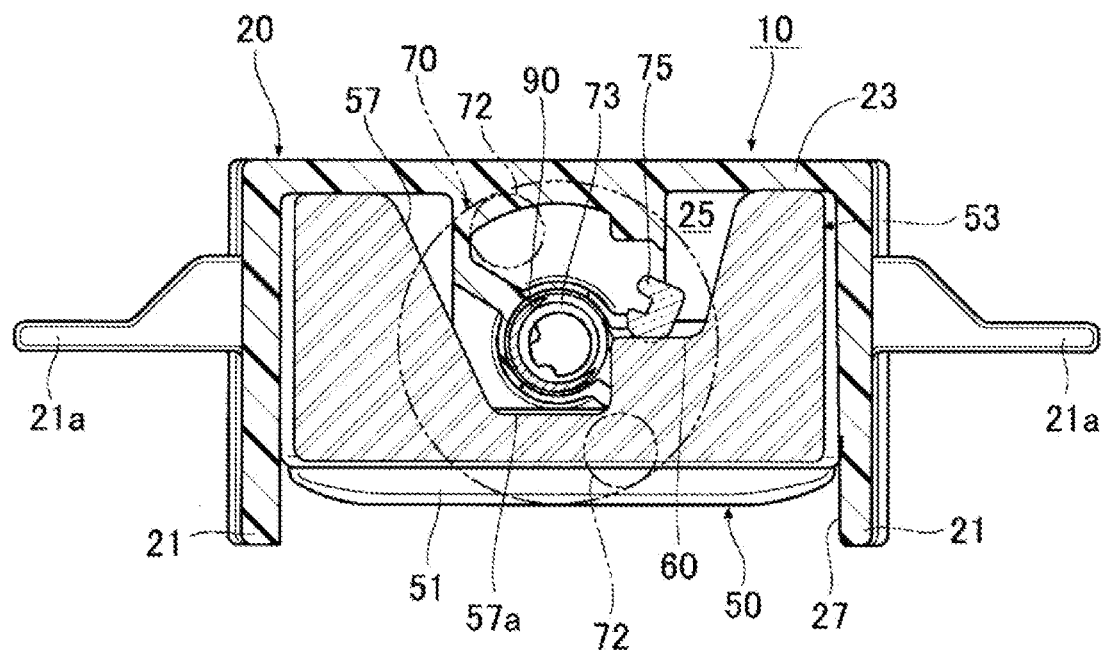
FIG. 14B is a cross-sectional view of a state in which the operating member is pushed in from the state in FIG. 14A.

The connecting walls 55 and 56 are formed with notch portions 57 and 58, respectively, for avoiding the retaining portion 74 provided in the rotating member 70 and the engaging portion (here, the bearing portion 30) provided in the housing 20. As shown in FIGS. 14A and 14B, both side portions of each of the notch portions 57 and 58 have a tapered surface shape in which a tip end side in an extending direction of the side wall 54 is largely opened and an opening amount is gradually decreased toward a base end side in the extending direction.

Further, a pressing portion 60 that presses a pressed portion 75 of the rotating member 70 is formed in the middle of one side portion of the notch portion 57. As shown in FIG. 6B, an end surface of the pressing portion 60 is a surface parallel to an inner surface 57a of the notch portion 57. As shown in FIGS. 5C and 14, the pressing portion 60 is disposed to face the pressed portion 75 of the rotating member 70.

The rotating member 70 is rotationally biased by the biasing member 90 in a direction of an arrow E1 in FIG. 14A (which is to be described later), and thus a rotational biasing force is applied to the pressing portion 60 via the pressed portion 75. As a result, the operating member 50 is biased in a direction protruding from the opening 27 of the housing 20. That is, the pressing portion 60 of the operating member 50 is a portion that presses and rotates the pressed portion 75 of the rotating member 70, and is also a portion that receives the rotational biasing force of the rotating member 70 from the pressed portion 75.

In both of a state in which the operating member 50 protrudes from the opening 27 by the rotational biasing force of the rotating member 70 as shown in FIG. 14A and a state in which the operating member 50 is pushed toward a deep side of the opening 27 against the rotational biasing force of the rotating member 70 as shown in FIG. 14B, the notch portions 57 and 58 described above receive the retaining portion 74 and the engaging portion (the bearing portion 30)

inside thereof in order to avoid the retaining portion 74 and the engaging portion (the bearing portion 30), so as not to interfere with a sliding operation of the operating member 50.

Further, each side wall 54 is formed with a deflectable engaging piece 61 via a substantially U-shaped slit 61*a*. The engaging piece 61 is slidably engaged with the retaining groove 44 (see FIGS. 2 and 3B) of the side wall 21 of the housing 20 to be retained to the opening 27 of the housing 20.

A guide protrusion 62, which is a ridge extending along the sliding direction S of the operating member 50, is provided on an outer surface of each side wall 54. Further, guide protrusions 63 and 63 protrude on both sides of an outer surface side of the connecting wall 55 in a width direction. The guide protrusions 62 and 63 enter the guide recess 41 of the side wall 21 of the housing 20 and the guide recess 43 of the ceiling wall 22, respectively, and are slide guides of the operating member 50.

Elastic pieces 64 and 64 are provided at positions aligned with the pair of guide protrusions 63 and 63 on the outer surface side of the connecting wall 55, respectively. The elastic piece 64 has a cantilever shape in which a base end thereof is connected to the connecting wall 55, and a tip end thereof faces a front surface side of the connecting wall 55. As shown in FIG. 13, the tip end of the elastic piece 64 elastically abuts on an inner periphery of the guide recess 43 of the ceiling wall 22 of the housing 20, so that the operating member 50 is prevented from rattling or being pulled inward into the housing 20.

A shape and a structure of the operating member are not limited to the above aspect. All of the portions (the pushing portion, the insertion portion, the pressing portion, and the like) constituting the operating member are integrally formed.

Figure 7A:
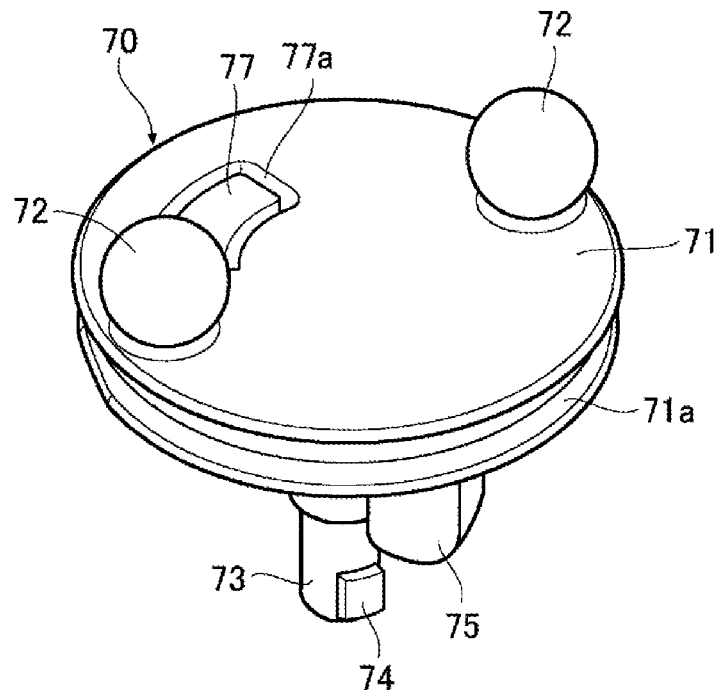

Next, the rotating member 70 (a rotor) will be described with reference to FIG. 7.

Figure 12:
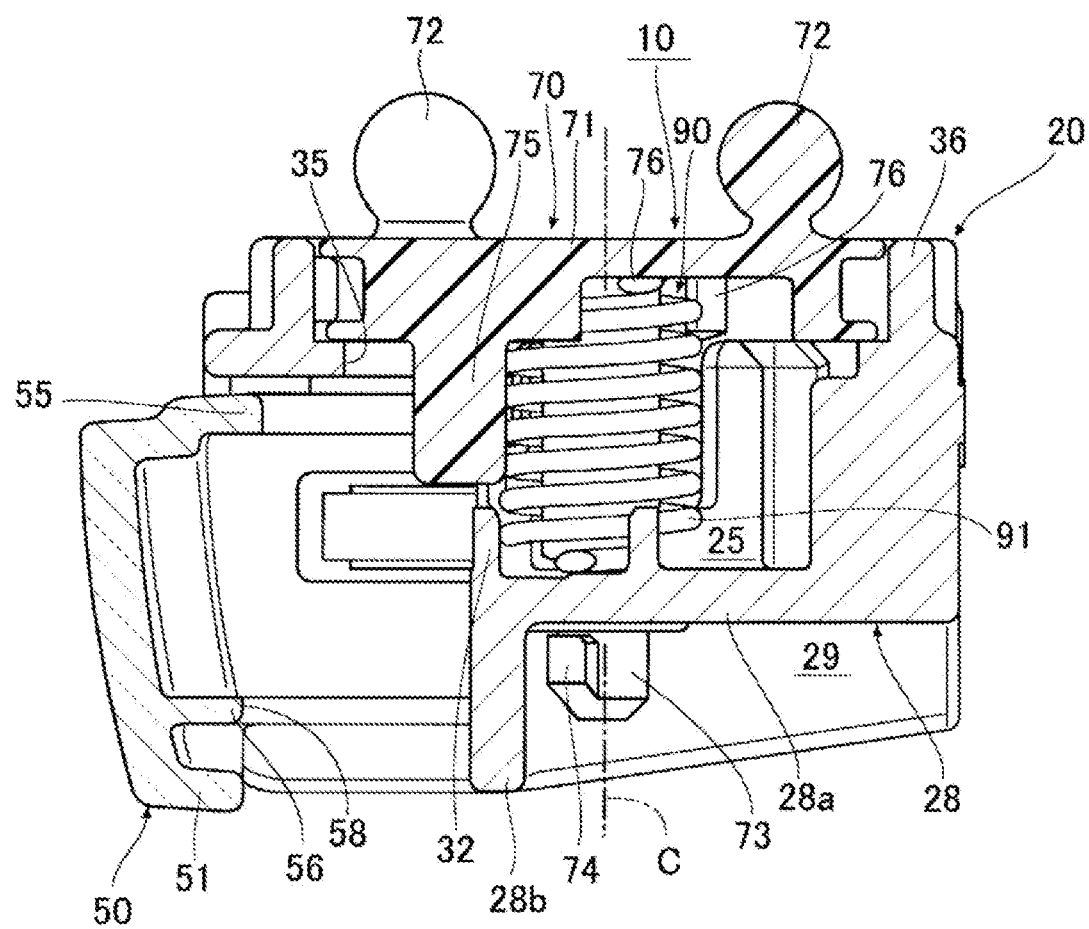
FIG. 12 is a cross-sectional view taken along a line B-B in FIG. 8.

The rotating member 70 of the embodiment includes the rotating body 71 having a substantially disk shape, connecting portions 72 and 72 having a substantially spherical shape protruding from two positions facing each other in a radial direction on a front side (a side opposite to a side supported by the housing 20) of the rotating body 71, and the support shaft 73 extending from a center of a back side (the side supported by the housing 20) of the rotating body 71 by a predetermined length, and is placed on an outer side of the accommodating portion 25 as shown in FIGS. 11 to 13. A ring mounting groove 71*a* having an annular recessed groove shape is formed on an outer periphery of the rotating body 71, and a seal ring (not shown) can be mounted.

Further, the rotating member 70 is provided with the retaining portion 74 for retaining the rotating member 70 with respect to the housing 20. In the embodiment, the retaining portion 74 having a protruding shape, which can be inserted into the notch groove 30*a* of the bearing portion 30, protrudes on a predetermined position on an outer periphery of a tip end side of the support shaft 73 in an extending direction.

Then, in a state in which the retaining portion 74 is aligned with the notch groove 30*a* of the bearing portion 30 provided in the housing 20, the support shaft 73 is inserted from the front side of the bearing portion 30 and pulled out from the back side of the bearing portion 30, and then the support shaft 73 is rotated in a predetermined direction, so that the support shaft 73 of the rotating member 70 is inserted, and the support shaft 73 is configured to be rotated and supported (rotatably supported) by the bearing portion 30, as shown in FIG. 13. In this state, the retaining portion 74 of the support shaft 73 is disposed in the retaining portion arrangement space 29 provided in the housing 20, and the retaining portion 74 is located at the peripheral edge of the back side (a bottom wall 24 side) of the bearing portion 30 excluding the notch groove 30*a*, so that the support shaft 73 is retained and held with respect to the bearing portion 30 (see FIG. 13). Further, in the above state, the rotating body 71 is rotatably supported by the peripheral edge of the front side of the rotor support hole 35 provided in the housing 20.

The rotating member 70 is rotatably supported by the housing 20 as described above, and a plane including a rotation locus of the rotating member 70 at this time is the "rotation plane of the rotating member" in the present invention. In FIG. 2, the rotation plane H is indicated by a two-dot chain line. An axial direction C of the support shaft 73 is a direction perpendicular to the rotation plane H.

Figure 9:
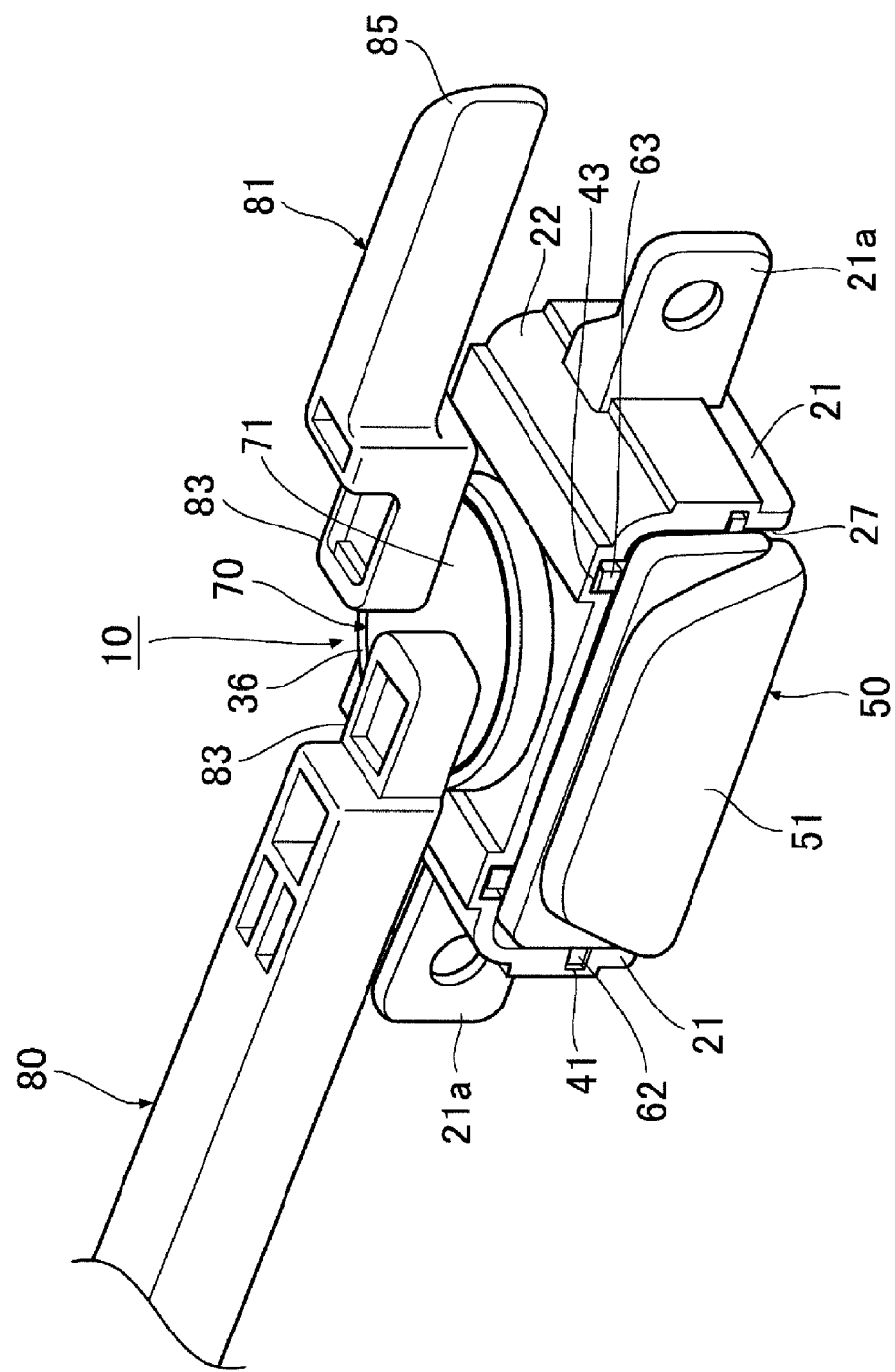
FIG. 9 is a perspective view of a state in which locking members are connected to FIG. 8.

Further, the pair of connecting portions 72 and 72 are inserted and fitted into recesses (not shown) provided on the base end portion 83 sides of the locking members 80 and 81, respectively, so that the base end portions 83 and 83 of the pair of locking members 80 and 81 are connected to the rotating member 70 as shown in FIG. 9.

Further, the rotating member 70 includes the pressed portion 75 pressed by the operating member 50. As shown in FIG. 12, the pressed portion 75 and the support shaft 73 extend from the rotating member 70 placed on the outer side of the accommodating portion 25 of the housing 20 toward the inner side of the accommodating portion 25. The pressed portion 75 has a protruding shape, and protrudes from a position adjacent to the support shaft 73 on the back side of the rotating body 71. In the unlocking device of Patent Literature 1, the support portion having a shaft shape protrudes from the front side wall portion of the accommodating portion provided in the case member, a protruding portion protrudes from a back side of the rotating member rotatably supported by the support portion, and the support portion and the protruding portion protrude in opposite directions to each other. In contrast, in the release device 10 according to the present invention, both the support shaft 73 and the pressed portion 75 protrude from the back side of the rotating body 71 of the rotating member 70 toward the inner side of the accommodating portion 25 of the housing 20 in the same direction, and the pressed portion 75 is disposed to overlap with (wrap) the support shaft 73 in the axial direction C. As shown in FIG. 13, the support shaft 73 and the pressed portion 75 extending from the back side of the rotating member toward the inner side of the accommodating portion are disposed to be located within a thickness range T of the operating member 50 when viewed from the sliding direction of the operating member 50, similarly to the retaining portion 74 and the engaging portion (here, the bearing portion 30) to be described later.

Figure 7B:
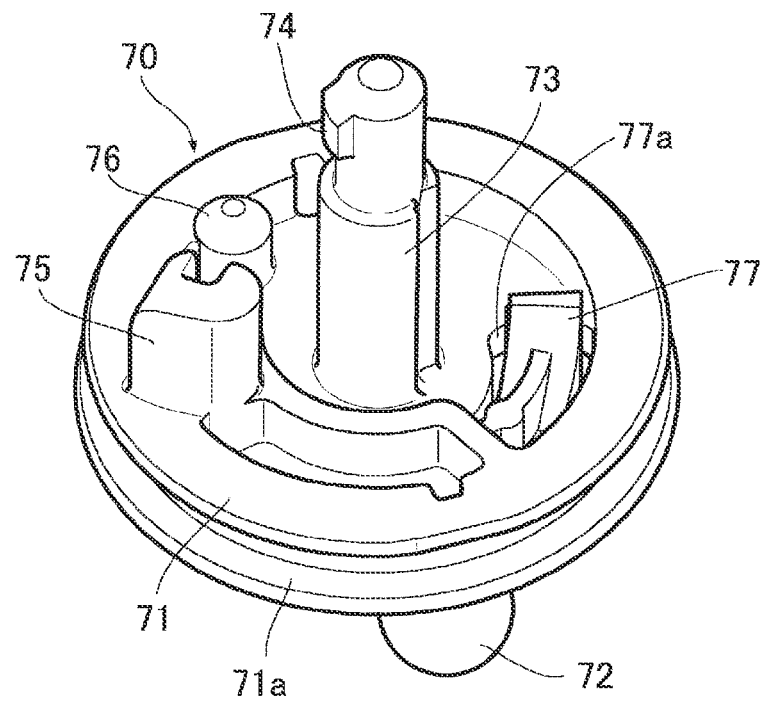
Figure 8:
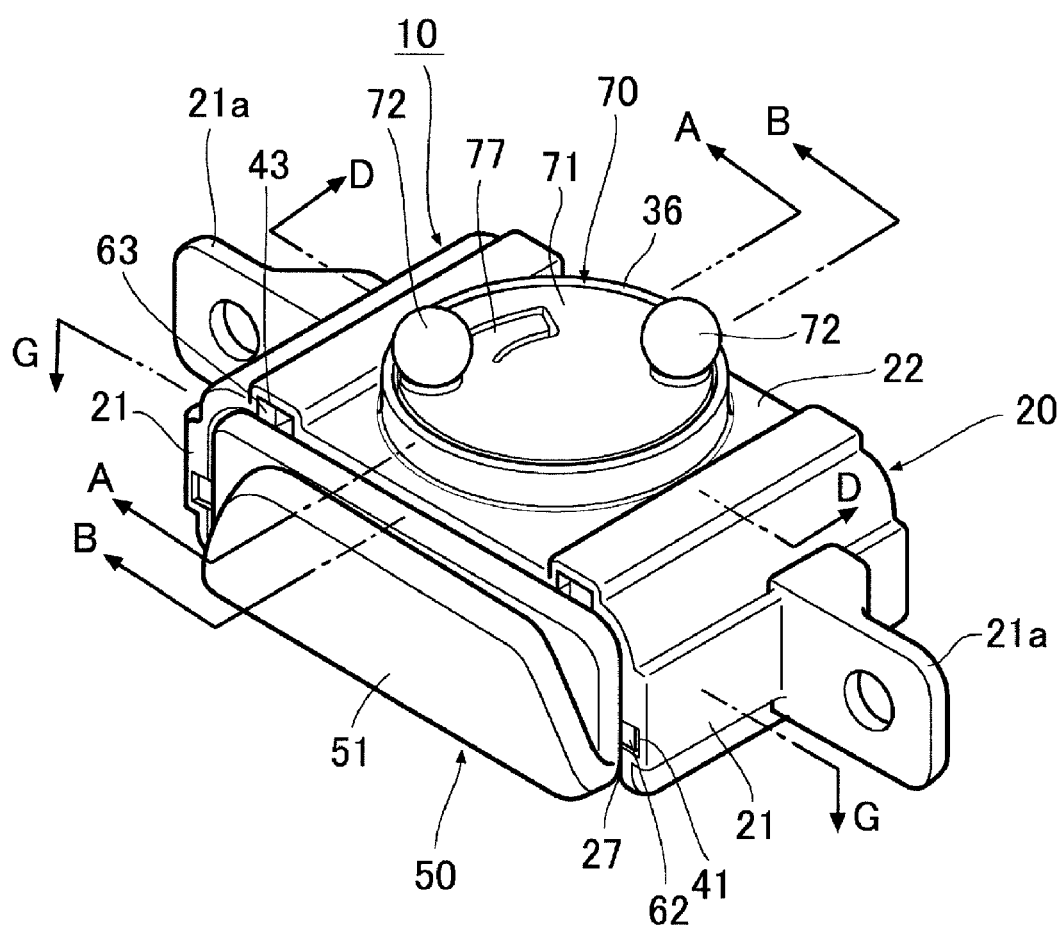
FIG. 8 is a perspective view of a state in which the unlocking device is assembled.

As shown in FIG. 7B, an arm locking protrusion 76 protrudes at a position adjacent to the pressed portion 75 in a circumferential direction on the back side of the rotating body 71. One arm portion 92 of the biasing member 90 is locked to the arm locking protrusion 76. The other arm portion 92 of the biasing member 90 is held by the arm holding portion 33 (see FIG. 4B) of the housing 20. Therefore, the rotating member 70 rotatably supported by the bearing portion 30 via the support shaft 73 is rotationally biased in the direction of the arrow E1 in FIGS. 14A and 15, and the tip end portions 85 and 85 of the pair of locking members 80 and 81 are biased in a direction (a direction of the arrow E2 in FIG. 15) of engaging with the pair of locking portions 1*b* and 1*b*, respectively.

Then, as shown in FIG. 14A, when the operating member 50 biased in the direction protruding from the opening 27 of the housing 20 by the rotational biasing force of the rotating member 70 is pushed toward one end side in the sliding direction S, the pressing portion 60 of the operating member 50 presses the pressed portion 75, and as shown in FIG. 14B, the rotating member 70 can be rotated in a direction opposite to the arrow E1 against the rotational biasing force. As a result, as shown in FIG. 16, the tip end portions 85 and 85 of the pair of locking members 80 and 81 are pulled in a direction not to engage with the locking portions 1b and 1b, so that a locked state of the opening and closing body 3 in which the opening portion 1a of the fixed body 1 is closed can be released.

Further, as shown in FIG. 7B, a reverse rotation restricting piece 77 which is deflectable via a slit 77a is formed at a position facing the pressed portion 75 in the radial direction with the support shaft 73 interposed therebetween on the back side of the rotating body 71. As described above, the reverse rotation restricting piece 77 is disposed adjacent to one side surface 34a (see FIG. 4B) of the reverse rotation restricting wall 34 provided in the housing 20 in a state where the retaining portion 74 is aligned with the notch groove 30a of the bearing portion 30 and the support shaft 73 is inserted into the bearing portion 30 and rotated, and restricts a rotation direction of the rotating member 70. That is, reverse rotation of the rotating member 70 once retained and held in the housing 20 is restricted to prevent the support shaft 73 from coming out of the retaining portion 74.

As shown in FIG. 13, the retaining portion 74 provided in the rotating member 70 and the engaging portion (here, the bearing portion 30) provided in the housing 20 are located within the thickness range T of the operating member 50 when viewed in the sliding direction S of the operating member 50. As shown in FIG. 13, the thickness range T means a range of the operating member 50 in the direction orthogonal to the rotation plane H of the rotating member 70. That is, the retaining portion 74 and the engaging portion (the bearing portion 30) are located to overlap (wrap) with each other in the range of the operating member 50 in the direction orthogonal to the rotation plane H of the rotating member 70.

The support shaft 73 is rotatably supported on at least two positions in a thickness direction of the housing 20 (the same direction as the thickness direction of the operating member 50, which means the direction orthogonal to the rotation plane H of the rotating member 70 in the housing 20), and the pressed portion 75 is located between the two positions when viewed in the sliding direction S of the operating member 50.

In the embodiment, as shown in FIG. 13, a tip end side of the support shaft 73 is inserted into the bearing portion 30 provided in the housing 20 and is rotatably supported, and the rotating body 71 is supported by the peripheral edge of the front side of the rotor support hole 35 provided in the housing 20, so that a base end side of the support shaft 73 is indirectly rotatably supported, and thus the support shaft 73 is rotatably supported on the two positions in the thickness direction of the housing 20. In this state, as shown in FIG. 13, the pressed portion 75 of the rotating member 70 is located between the tip end side of the support shaft 73 rotatably supported by the bearing portion 30 and the base end side of the support shaft 73 indirectly rotatably supported by the rotor support hole 35 via the rotating body 71. The support shaft may be rotatably supported at one position or at three or more positions.

A shape and a structure of the rotating member are not limited to the above aspect. Further, all of the portions (the rotating body, the support shaft, the retaining portion, the pressed portion, and the like constituting the rotating member are integrally formed.

In the embodiment, the support shaft 73 is provided on the rotating member 70 side, and the retaining portion 74 is formed on the tip end side thereof, and meanwhile, the engaging portion (the bearing portion 30) is provided on the housing 20 side, but the present invention is not limited to this aspect. For example, the configuration may be such that a support shaft protrudes from a housing side, and a protrusion is provided at a tip end of the support shaft, and meanwhile, a bearing portion having a hole shape is provided in a rotating member and rotatably supports the support shaft, and the protrusion is engaged with a peripheral edge of a front side thereof (in this case, the protrusion at the tip end of the support shaft on the housing side is the "engaging portion", and the bearing portion having a hole shape on a rotating member side is the "retaining portion"). In addition, the retaining portion and the engaging portion are not limited to the protruding shape and the hole shape as described above, and may have any shape and structure as long as the retaining portion and the engaging portion are engaged with each other and can retain and hold the rotating member to the housing.

In the embodiment, the support shaft 73 and the bearing portion 30 rotatably supporting the support shaft 73 are provided between the rotating member 70 and the housing 20, but forming positions of the support shaft and the bearing portion are not particularly limited as long as the forming positions are between the rotating member and the housing.

Next, the operation and effect of the release device 10 having the above configuration will be described.

In the release device 10, when the opening and closing body 3 is closed from a state where the opening and closing body 3 is opened from the opening portion 1a of the fixed body 1, the tip end portions 85 and 85 of the pair of locking members 80 and 81 are engaged with the locking portions 1b and 1b of the fixed body 1, and thus the opening and closing body 3 is locked in the closed state as shown in FIG. 15.

In this state, as shown in FIG. 14A, the operating member 50 is in a state of protruding from the opening 27 of the housing 20. When the operating member 50 is pushed in from the state shown in FIG. 14A, the pressing portion 60 of the operating member 50 presses the pressed portion 75, and as shown in FIG. 14B, the rotating member 70 is rotated in the direction opposite to the arrow E1 against the rotational biasing force, and as shown in FIG. 16, the tip end portions 85 and 85 of the pair of locking members 80 and 81 are pulled in the direction not to engage with the locking portions 1b and 1b, so that the locked state of the opening and closing body 3 can be released, and the opening and closing body 3 can be opened from the opening portion 1a of the fixed body 1.

In the release device 10, as shown in FIG. 13, the retaining portion 74 and the engaging portion (here, the bearing portion 30) are located within the thickness range T of the operating member 50 when viewed in the sliding direction S of the operating member 50, so that a thickness of the release device 10 can be reduced. That is, unlike the configuration in which the pair of rotor holding portions are arranged above the rotation plane of the rotating member and the retaining structure of the rotating member protrudes as in the unlocking device of Patent Literature 1, the retaining portion 74 and the engaging portion (the bearing portion 30) are provided to be within the thickness range T of the operating member 50, and the retaining structure of the rotating member 70 is prevented from protruding in the thickness direction of the release device 10, so that the release device 10 can be prevented from being bulky, and the thickness thereof can be reduced.

Figure 5A:
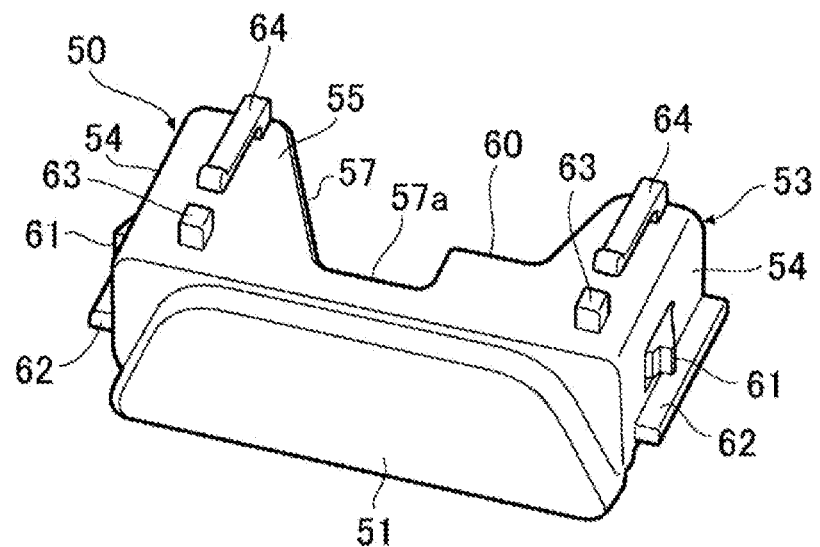
Figure 5B:
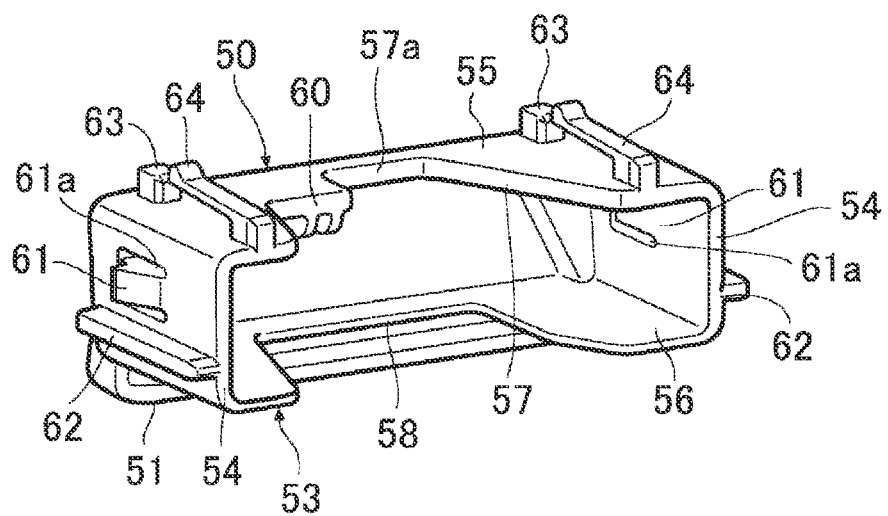
Figure 5C:
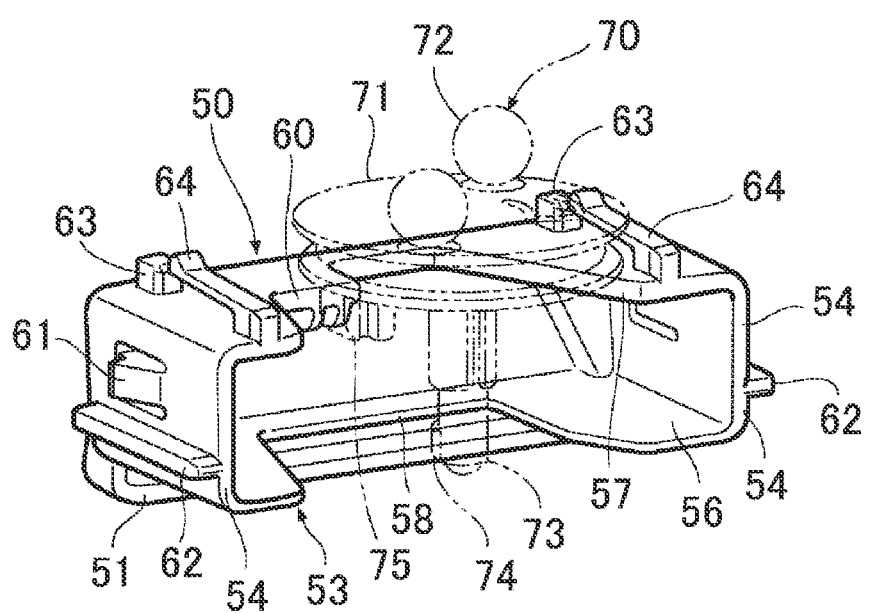
Figure 6A:
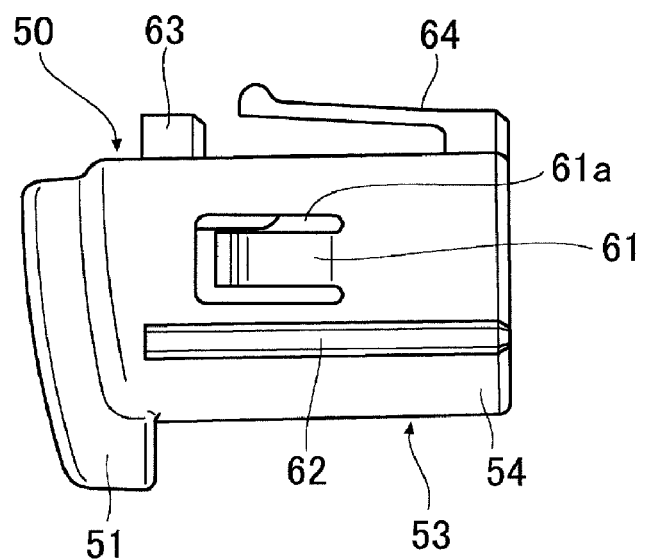
Figure 6B:
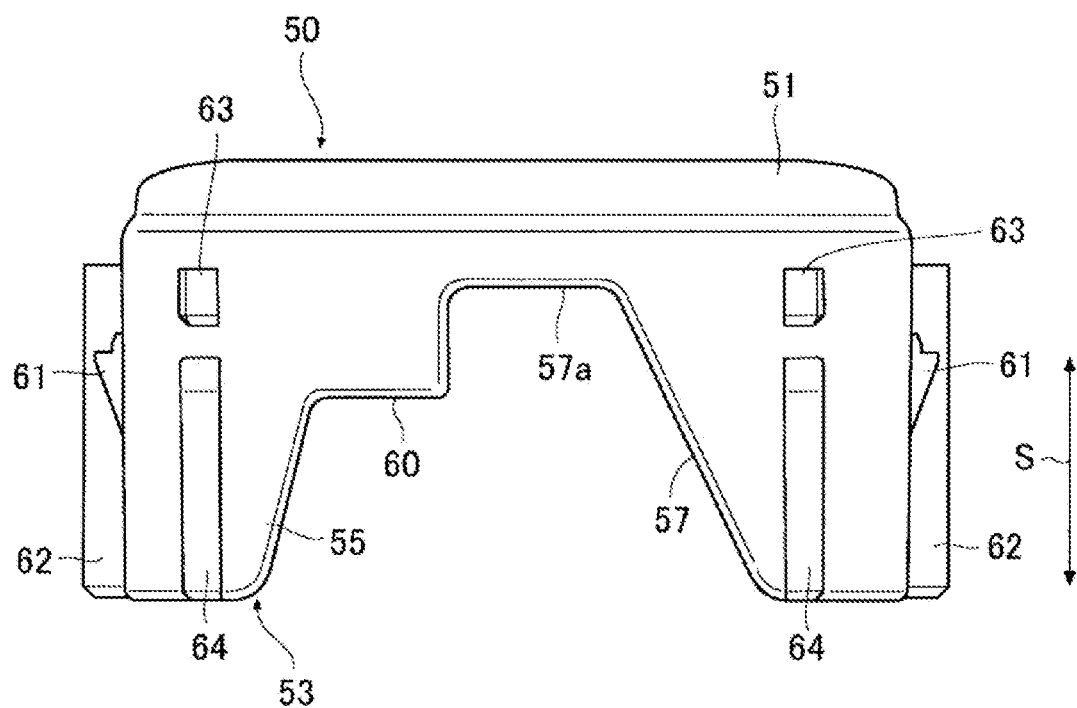

In the embodiment, as shown in FIGS. 5 and 6, the operating member 50 is formed with the notch portions 57 and 58 for avoiding the retaining portion 74 and the engaging portion (here, the bearing portion 30). Therefore, as shown in FIGS. 14A and 14B, the release device 10 can be made compact in the sliding direction S of the operating member 50 while ensuring a stroke amount of the slide operation of the operating member 50.

Further, as shown in FIG. 12, in the embodiment, the rotating member 70 is provided with the support shall 73 which is rotatably supported by the bearing portion 30 provided in the housing 20, and is placed on the outer side of the accommodating portion 25, and the pressed portion 75 and the support shaft 73 extend from the rotating member 70 placed on the outer side of the accommodating portion 25 toward the inner side of the accommodating portion 25.

According to this aspect, the pressed portion 75 and the support shaft 73 extend from the rotating member 70 placed on the outer side of the accommodating portion 25 toward the inner side of the accommodating portion 25, and thus an operating load when the operating member 50 is pushed can be prevented from being biased with respect to the support shaft 73 (in a case of Japanese Patent No. 6420618 of Patent Literature 1, since the support portion rotatably supporting the rotating member and the protruding portion receiving a load from the operating member are in opposite directions, the load is easily biased), and the rotating member 70 can be rotated smoothly. By adopting the above configuration, the support shaft 73 and the pressed portion 75 are easily located within the thickness range T of the operating member 50 when viewed from the sliding direction of the operating member 50 as shown in FIG. 13, and the thickness of the release device 10 is easily further reduced.

In the embodiment, as shown in FIG. 13, the support shaft 73 is rotatably supported on at least two positions in the thickness direction of the housing 20, and the pressed portion 75 is located between the two positions when viewed in the sliding direction S of the operating member 50. Therefore, the support shaft 73 receives the operation load from the operating member 50 between the at least two positions in the thickness direction of the housing 20, and thus the support shaft 73 can be made difficult to tilt, and the rotational operation of the rotating member 70 can be made smoother.

The present invention is not limited to the embodiment described above, and various modifications can be made within the scope of the gist of the present invention, and such embodiments are also included in the scope of the present invention.

REFERENCE SIGNS LIST

10: unlocking device (release device)
20: housing
25: accommodating portion
27: opening
30: bearing portion
50: operating member
51: pushing portion
53: insertion portion
60: pressing portion
70: rotating member
73: support shaft
74: retaining portion
75: pressed portion
80, 81: locking member
90: biasing member
H: rotation plane

The invention claimed is:

1. An unlocking device, comprising:
a rotating member configured to slide, by rotation, a locking member engaged with and disengaged from a locking portion;
a housing that rotatably supports the rotating member;
an operating member configured to rotate the rotating member; and
a biasing member configured to rotationally bias the rotating member, wherein
the rotating member includes a pressed portion configured to be pressed by the operating member, and a retaining portion configured to retain the rotating member with respect to the housing,
the housing includes an accommodating portion configured to slidably accommodate the operating member, an engaging portion that is engaged with the retaining portion, and an opening that communicates with the accommodating portion,
the operating member includes a pressing portion configured to press the pressed portion, is configured to be accommodated in the accommodating portion, is slidable in a direction substantially parallel to a rotation plane of the rotating member, and is biased in a direction protruding from the opening by a rotational biasing force from the pressed portion being applied to the pressing portion,
the retaining portion and the engaging portion are located within a thickness range of the operating member when viewed from a sliding direction of the operating member, and
the thickness range is a range of the operating member in a direction orthogonal to the rotation plane of the rotating member.

2. The unlocking device according to claim 1, wherein the operating member is formed with a notch portion that avoids the retaining portion and the engaging portion.

3. The unlocking device according to claim 1, wherein the rotating member is provided with a support shaft that is rotatably supported by a bearing portion provided in the housing, and is placed on an outer side of the accommodating portion, and
the pressed portion and the support shaft extend from the rotating member placed on the outer side of the accommodating portion toward an inner side of the accommodating portion.

4. The unlocking device according to claim 3, wherein the support shaft is rotatably supported on at least two positions in a thickness direction of the housing, and the pressed portion is located between the two positions when viewed in the sliding direction of the operating member.

* * * * *